M. GLASSBERG.
DRIPPING PAN FOR ICE BOXES.
APPLICATION FILED JAN. 27, 1909.
931,751.
Patented Aug. 24, 1909.
2 SHEETS—SHEET 1.
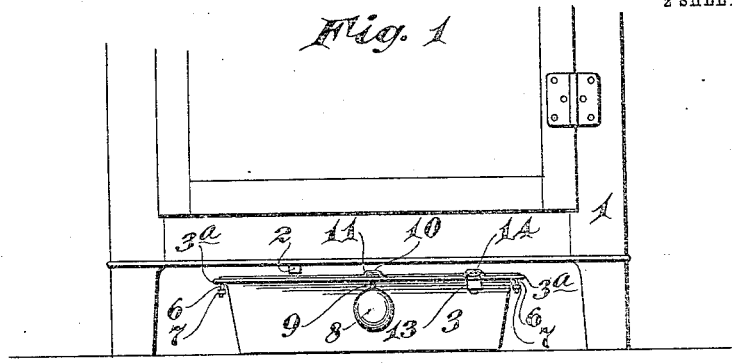
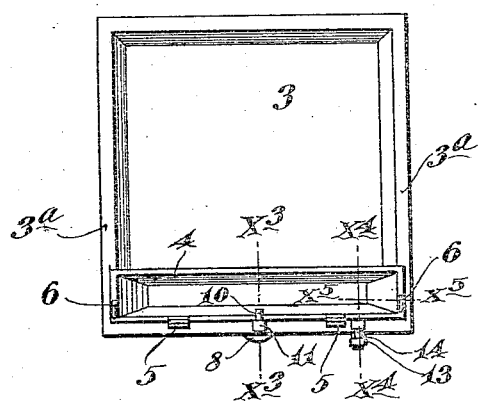
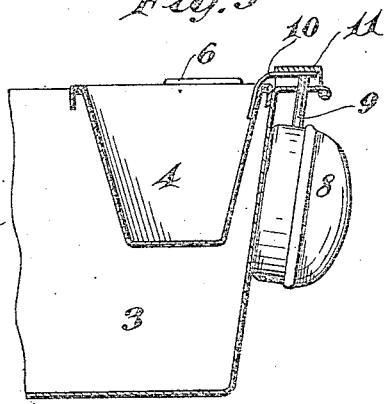
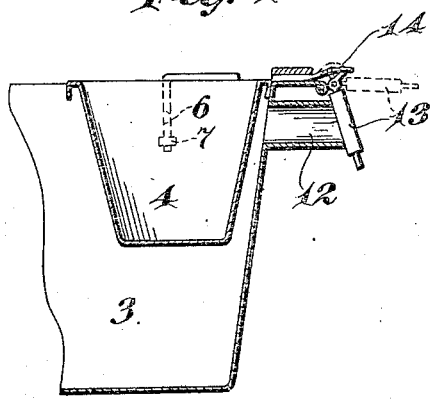
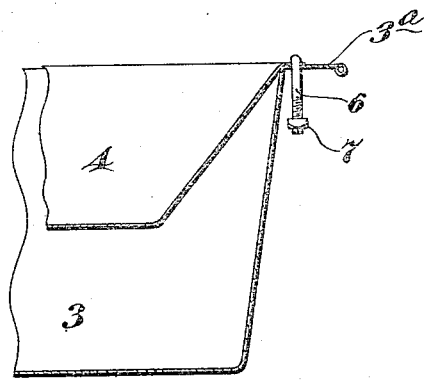
Witnesses:
L. L. Simpson
A. H. Opsahl
Inventor:
Moritz Glassberg
By his Attorneys:
Williamson & Merchant

M. GLASSBERG.
DRIPPING PAN FOR ICE BOXES.
APPLICATION FILED JAN. 27, 1909.

931,751.

Patented Aug. 24, 1909.
2 SHEETS—SHEET 2.

UNITED STATES PATENT OFFICE.

MORITZ GLASSBERG, OF MINNEAPOLIS, MINNESOTA.

DRIPPING-PAN FOR ICE-BOXES.

931,751.  Specification of Letters Patent.  Patented Aug. 24, 1909.

Application filed January 27, 1909. Serial No. 474,418.

*To all whom it may concern:*

Be it known that I, MORITZ GLASSBERG, a citizen of the United States, residing at Minneapolis, in the county of Hennepin and State of Minnesota, have invented certain new and useful Improvements in Dripping-Pans for Ice-Boxes; and I do hereby declare the following to be a full, clear, and exact description of the invention, such as will enable others skilled in the art to which it appertains to make and use the same.

My invention relates to drip pans for ice boxes, and has for its especial object to provide therefor an alarm device to indicate when the water in the drip pan has reached a predetermined height.

To the above ends, the invention consists of the novel devices and combinations of devices hereinafter described and defined in the claim.

The invention is illustrated in the accompanying drawings wherein like characters indicate like parts throughout the several views.

Figure 6:
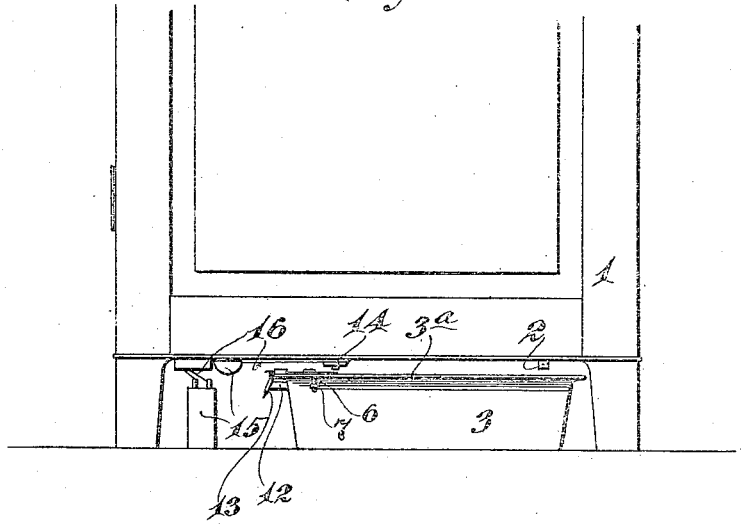
Figure 7:
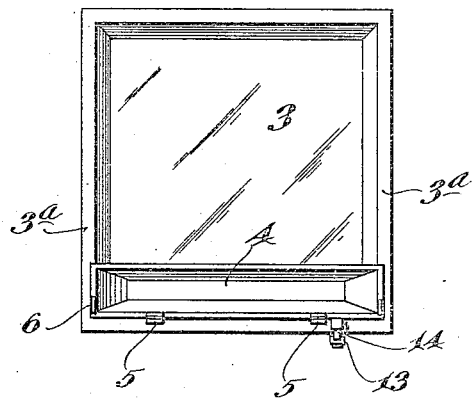

Referring to the drawings, Figure 1 is a view in front elevation showing the lower portion of an ice box and a drip pan; Fig. 2 is a plan view of the drip pan; Fig. 3 is a detailed view on an enlarged scale, in vertical section, taken on the line $x^3$ $x^3$ of Fig. 2; Fig. 4 is a detailed view on an enlarged scale, in vertical section, taken on line $x^4$ $x^4$ of Fig. 2; Fig. 5 is a detailed view on an enlarged scale, in vertical section, taken on the line $x^5$ $x^5$ of Fig. 2; Fig. 6 is a view corresponding to Fig. 1, but showing a different alarm device; and Fig. 7 is a plan view of the drip pan shown in Fig. 6.

The numeral 1 indicates the lower portion of an ice box provided with the customary water discharge spout 2 leading from the ice chamber and arranged to discharge into a drip pan 3. A float 4, having an open top, is secured by hinges 5 to the front and upper edge of the drip pan 3. To limit the upward movement of the float 4, a pair of downwardly projecting studs 6 are secured one to each end of the float 4 and work through perforations in an out-turned flange $3^a$ of the pan 3. The lower ends of the studs 6 are screwed-threaded and provided with nuts 7, which nuts are adapted to engage the under side of the out-turned flange $3^a$ of the drip pan 3 to limit the upward movement of the float 4. As is evident, by adjusting the nut 7 on the stud 6, the upward movement of the float 4 may be varied at will.

A spring actuated bell 8 of the ordinary or any desired construction is secured to the front of the drip pan 3 and the upwardly spring pressed bell actuating plunger 9 of the bell 8 engages an upwardly and outwardly projecting finger 10 rigidly secured to the intermediate portion of the float 4. The free end of the finger 10 and plunger 9 are covered and protected by a metal strip 11 secured to the flange $3^a$ of the drip pan 3. As is evident, when the water in the drip pan 3 rises high enough to operate the float 4, the finger 10 presses the plunger 9 downward, thereby actuating the bell 8 to give an alarm when the water in the drip pan 3 has reached a predetermined height so that the pan may be emptied before the water runs over the pan and onto the floor.

An overflow pipe 12 is secured to and opened into the upper right hand corner of the drip pan 3. A valve 13, hinged to the outer edge of the flange $3^a$ of the drip pan 3, above the overflow pipe 12, normally closes the outer end of said overflow pipe. The valve 13 is held in either its open or closed position by a spring 14 secured to the flange $3^a$ of the drip pan 3. Ordinarily, the overflow pipe 12 will be closed by the valve 13, but when it is necessary to leave the drip pan 3 an unusually long time without emptying the same, the valve 13 is opened, as shown in Fig. 4, and a dish or pan, not shown, is placed on the floor in a position to receive the overflow from pipe 12.

The construction illustrated in Figs. 6 and 7 is substantially the same as that shown in Figs. 1 to 4, inclusive, except, in place of the spring actuated bell 8, an electric bell and push button of the standard construction are used. The numeral 14 indicates the push button secured to the under side of the ice box 1 in position to be engaged by the free upper edge of the float 4 when the same is lifted by the water in the drip pan 3. The electric bell and battery are indicated by the numeral 15 and the wiring from the push button to the bell and battery is indicated by the numeral 16. It may be here stated that in place of the electric bell, a buzzer may be used.

In actual practice, the above described invention has been found highly efficient for the purposes had in view.

What I claim is:

The combination with a drip pan and an open float hinged thereto for upward swinging movement, said float having laterally projecting flanges for engagement with the upper edge of said drip pan, for supporting said float in an inoperative position, of an alarm device arranged to be actuated by said float when the water in the pan has risen to a predetermined height, and means for limiting the upward swinging movement of said float with respect to said drip pan, substantially as described.

In testimony whereof I affix my signature in presence of two witnesses.

MORITZ GLASSBERG.

Witnesses:
  ALICE V. SWANSON,
  HARRY D. KILGORE.